United States Patent

[11] 3,632,222

| [72] | Inventor | Val Cronstedt |
| | | Williamsport, Pa. |
| [21] | Appl. No. | 82,759 |
| [22] | Filed | Oct. 21, 1970 |
| [45] | Patented | Jan. 4, 1972 |
| [73] | Assignee | Avco Corporation |
| | | Williamsport, Pa. |

[54] DAMPING MEANS FOR DIFFERENTIAL GAS TURBINE ENGINE
5 Claims, 6 Drawing Figs.

[52] U.S. Cl........................................ 415/119,
  415/122, 416/500, 60/39.75
[51] Int. Cl.........................................F01d 15/12,
  F02c 3/00
[50] Field of Search........................... 415/122,
  119; 416/500; 417/406; 60/39.75; 165/8

[56]  References Cited
UNITED STATES PATENTS

| 2,693,080 | 11/1954 | Hutchinson.................. | 60/39.28 |
| 2,850,876 | 9/1958 | Wood........................... | 60/39.75 |
| 2,977,758 | 4/1961 | Haworth et al. .............. | 60/39.75 |
| 3,145,534 | 8/1964 | Williams et al. .............. | 165/8 |
| 3,271,949 | 9/1966 | Jones et al. ................... | 415/122 |

*Primary Examiner*—Henry F. Raduazo
*Attorneys*—Charles M. Hogan and Gary M. Gron

ABSTRACT: The disclosure illustrates a damping device for a gas turbine engine of the type that has a centrifugal compressor impeller and aft positioned turbine wheel connected by concentric shafts to a forward mounted differential which has an output shaft. The device is positioned on the turbine shaft closely adjacent the differential drive to damp torsional vibrations.

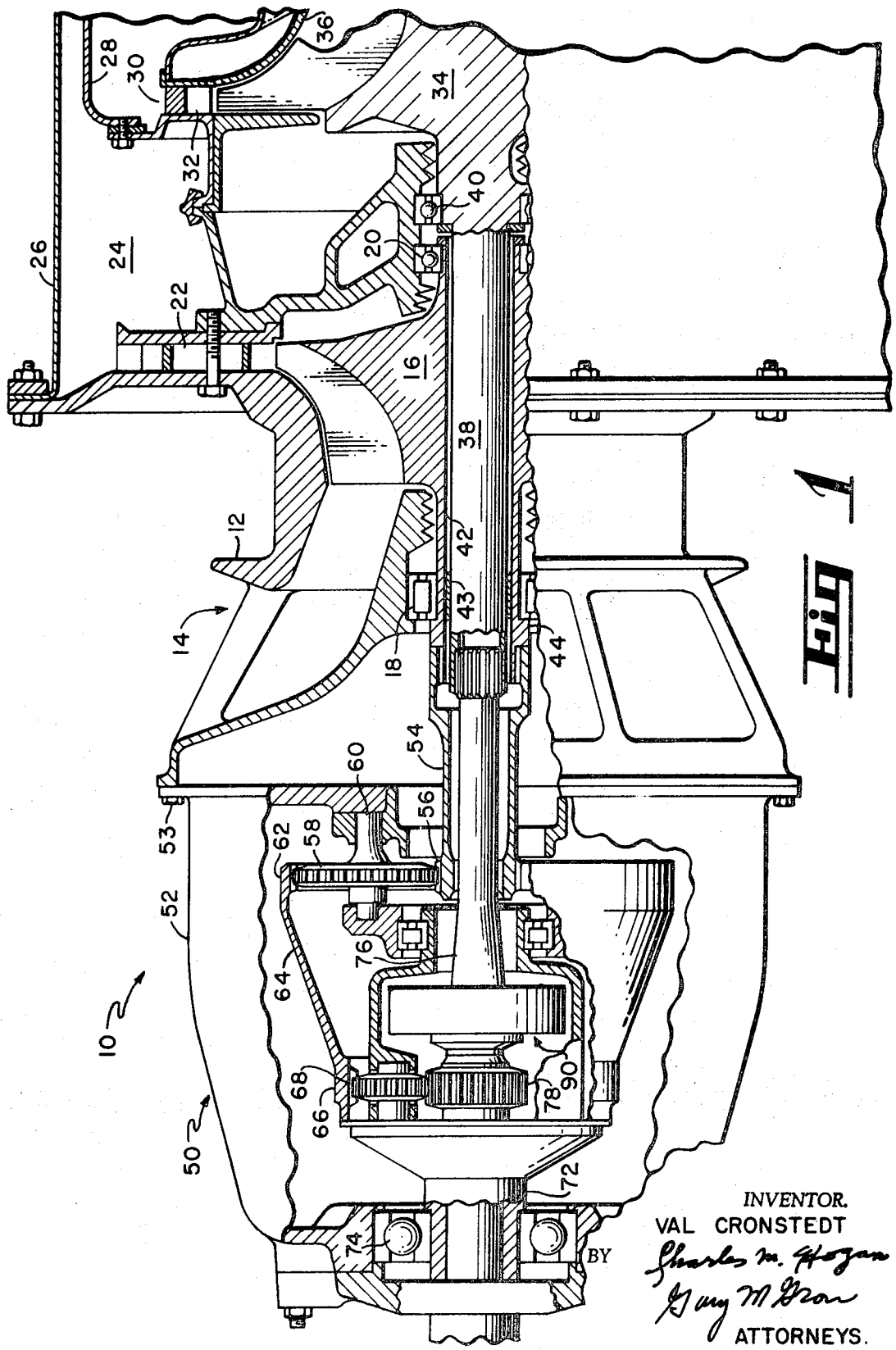

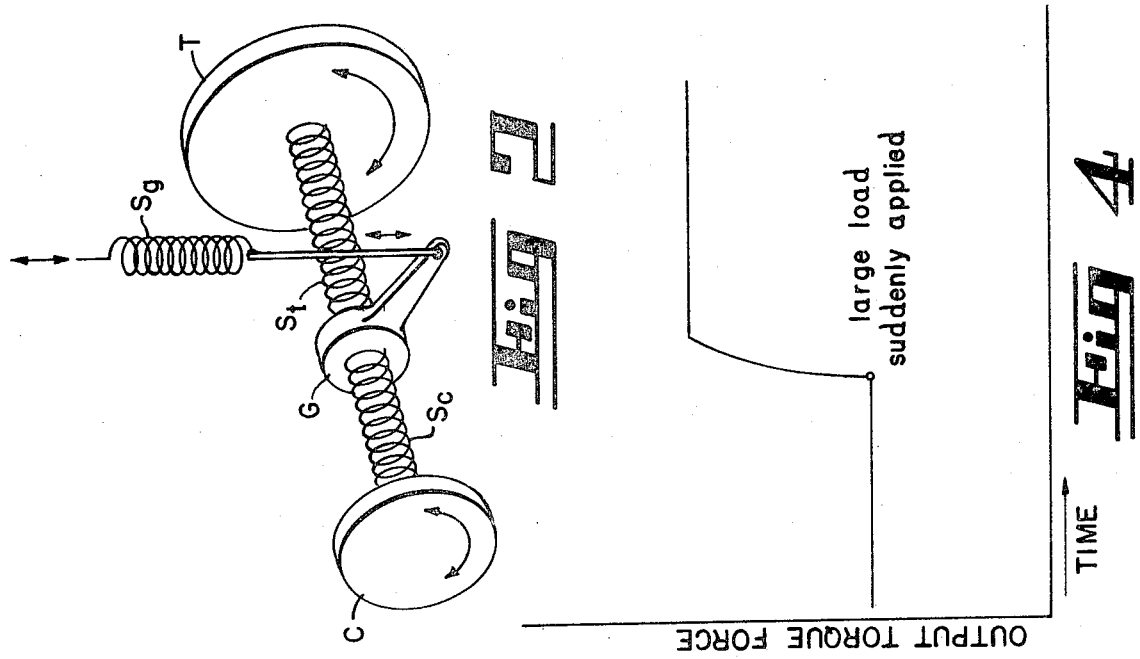
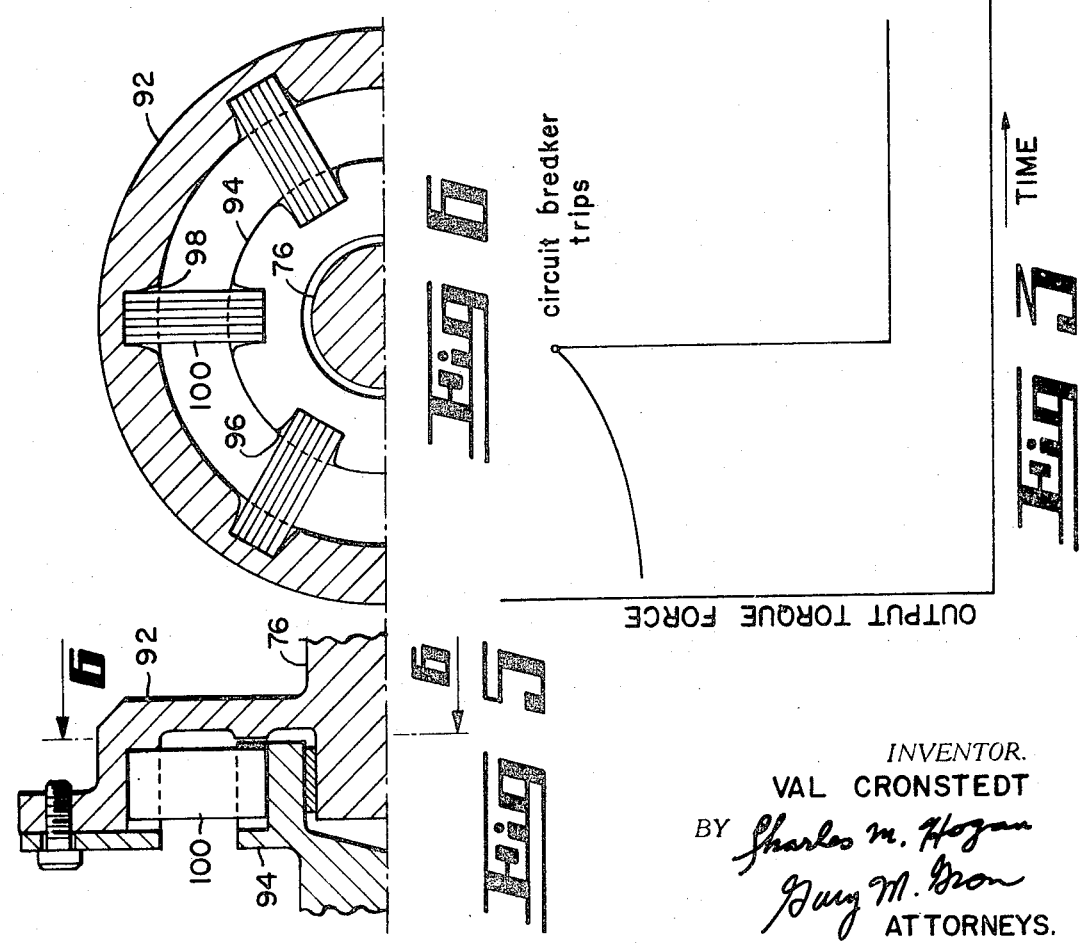

DAMPING MEANS FOR DIFFERENTIAL GAS TURBINE ENGINE

BACKGROUND OF THE INVENTION

The present invention relates to differential gas turbine engines generally of the type described in U.S. Pat. No. 2,693,080 entitled "Differential Gas Turbine" and in the name of David W. Hutchinson.

This type of gas turbine engine comprises a usual compressor, combustor and turbine. However, the compressor and turbine rotors are connected to an output shaft by means of a differential gear box. This arrangement enables the compressor to be operated at an r.p.m. where it is most efficient. At the same time the turbine can rotate at varying speeds to produce the required output torque even for very low output shaft r.p.m.'s. This eliminates the need for a costly and complicated independently rotatable, power turbine assembly.

SUMMARY OF THE INVENTION

The present invention is incorporated in a gas turbine engine comprising a housing and a centrifugal compressor and turbine journaled for rotation in the housing. A differential drive receives inputs from shafts that extend to the compressor and turbine and has an output shaft. A vibration damper is incorporated in the turbine shaft closely adjacent the differential drive for damping torsional vibrations.

DETAILED DESCRIPTION

In the drawings:

FIG. 1 is a longitudinal section view of a differential gas turbine engine embodying the present invention;

FIG. 2 is a schematic representation of the rotative components in the gas turbine engine of FIG. 1 that are subjected to torsional vibrations;

FIGS. 3 and 4 are diagrams of typical changes in the torque output requirements of the engine of FIG. 1;

FIGS. 5 and 6 are greatly enlarged longitudinal and cross section views, respectively, of a vibration damper used with the engine of FIG. 1.

FIG. 1 shows a differential gas turbine engine 10 comprising a housing 12 having an annular opening 14 for inlet air which is received by a bladed centrifugal compressor impeller 16, journaled in housing 12 by bearing assemblies 18, 20. The air discharged from the top of bladed impeller 16 passes radially outward through an annular diffuser 22 and into a chamber 24, defined in part by outer casing 26.

The pressurized air from diffuser 22 passes through chamber 24 to a combustor (not shown) where fuel is injected and the resultant mixture is ignited by a suitable source to produce a hot gas stream. The combustor may take the form of an annular combustor or a tangential combustor, as is well known to those skilled in the art. With either type of combustor the hot gas stream passes to a turbine inlet duct 28 having an annular radially inward directed outlet 30. The outlet 30 opens to a turbine nozzle assembly 32 which directs the hot gases generally tangential to the periphery of a bladed turbine wheel 34 causing it to rotate. The gases are then expelled through an annular exhaust duct 36 (only a portion of which is shown).

The turbine wheel 34 is aft of the compressor impeller 16 and has an elongated shaft 38 journaled for rotation adjacent turbine wheel 38 by bearing assembly 40. Shaft 38 is coaxial with and extends forward through a passage 42 in output shaft 44 for impeller 16. A sleeve bearing 43 in passage 42 journals the forward end of shaft 38.

Both shafts 44 and 38 extend forward to a differential gear box, generally indicated by reference character 50. Gear box 50 has an outer housing 52 secured to housing 12 by screws 53. Compressor shaft 44 connects through a suitable spline with a compressor input shaft 54 having an integral sun gear 56. Compressor sun gear 56 meshes with a plurality of planetary gears 58 (only one of which is shown). Each gear 58 is journaled for rotation on a shaft 60 which is fixed to housing 52. Planetary gears 58 also mesh with a ring gear 62 integral with an annular ring member 64. Annular ring member 64 has a second ring gear 66 which meshes with a series of planetary gears 68 (only one of which is shown). Planetary gears 68 are journaled for rotation on shafts 70 which are connected to an output shaft 72 journaled in bearing 74.

The turbine shaft 38 connects, through a splined connection, to a turbine input shaft 76. The turbine input shaft 76 has a sun gear 78 on its forward end which meshes with the planetary gears 68.

In operation the impeller 16 rotates at a high speed to pressurize air for delivery to the combustor. The hot gases passing across the turbine cause it to rotate and drive both the compressor and the output shaft via the differential drive 50. The speed of the turbine shaft varies to produce the required amount of torque on the output shaft 72 for its particular r.p.m.

The differentially coupled arrangement of this particular engine has the compressor and turbine shafts 44 and 38, respectively, independently supported and concentric with one shaft running within the other. The compressor 16 is a centrifugal radial outflow type and aerodynamic considerations dictate a relatively small diameter of the compressor shaft. Furthermore, the centrifugal radial outflow compressor requires an axially directed inlet which is smoothly turned from a radially inward directed inlet. This magnifies the distance between the compressor impeller 16 and the gear box 50. The opening in the compressor impeller through which the turbine shaft 38 extends must be as small as possible to minimize stresses on the impeller caused by centrifugal force. As a consequence, both the compressor and turbine shaft systems are not only small in diameter but also long and slender.

These components, together with the gear box, form a torsional system which is schematically represented in FIG. 2. The rotating mass of the turbine is represented by disc T and the rotating mass of the compressor is represented by disc C. The long and slender turbine shaft and compressor shafts are represented respectively by springs $S_t$ and $S_c$. The rotating mass of the gear box is represented by disc G and the flexibility in the gear box and associated gearing system is represented by spring $S_g$. It is very important to recognize that the system shown schematically in FIG. 2 illustrates the torsional relationship of the various components relative to each other. The entire system is rotating at its normal operating rate. This figure merely illustrates the way in which the components oscillate with respect to one another.

Under a steady-state output power condition the torque force applied to the gear box through the output shaft remains constant. However, when the power required by the engine suddenly increases, a large transient torque pulse, represented in FIG. 3, is introduced into the system. Conversely, when the engine is driving a load, such as a generator, and the circuit breaker trips, disconnecting the output of the generator, a sudden torque decrease pulse, illustrated in FIG. 4, is introduced into the system of FIG. 2. These torque pulses (represented by the vertical arrow) are introduced through the gear box $S_g$ and the high inertial forces of the compressor and turbine hubs will resist a change in speed. As a result, the torsional springs $S_g$ and $S_t$ will wind up and the compressor and turbine wheels act as torsional pendulums, each having a natural torsional frequency of its own. These torsional pendulums will begin to swing at their natural frequency while rotating at a high speed. The oscillation of these pendulums is illustrated by the arrows on the compressor and turbine discs C and T of FIG. 2.

Because of the relatively low torsional spring rate of the shafts and the high inertia of the wheels, the natural frequency of the resultant torsional pendulum is relatively low. Since the shafts rotate at a very high speed, it may take several rotations of the shafts to complete each cycle of swing. A typical example of a natural frequency which may result is a natural frequency of 100 cycles per second for the turbine wheel 34 which has a rotating speed of approximately 60,000 r.p.m. The compressor wheel system has a natural frequency of 250 cycles per second for an operating speed of approximately 50,000 r.p.m. It is apparent that the shafts must rotate through a number of revolutions to complete a torsional vibration cycle and that the natural frequencies of the pendulums do not necessarily coincide. The net effect of this is to torsionally load and unload the teeth in the gear box 50 which has a harmful effect on the life of the gears.

In accordance with the present invention a deliberate mechanical damping is introduced in the rotating pendulum systems to prevent these swings to reach a harmful amplitude and duration. This vibration damper is generally indicated by reference character 90 and is interposed in the turbine shaft 76 closely adjacent the differential drive 50 of FIG. 1.

While the damper may take many forms, one such damper is shown in detail in FIGS. 5 and 6. The damper 90 comprises an outer annular member 92 and an inner annular member 94. These members, as herein shown, are integral with forward and aft ends of turbine shaft 76. Both the inner and outer annular members 94 and 92 have a series of axially extending grooves 96 and 98, respectively. These grooves 98 and 96 are aligned in pairs and each receive a series of radially extending relatively thick leaf spring elements 100 sandwiched together and held tightly at their ends. The grooves 96 and 98 have curved sidewalls so as to permit bending movement of the leaf springs 100.

Relative torsional movement between the annular members 92, 94 causes the sheets 100 to rub against one another and provide a damping force by converting the vibratory energy into heat through frictional engagement.

Thus when a torque impulse is introduced into the output shaft 72 of engine 10, the damping device 90 causes any torsional vibration in the turbine wheel 34 to quickly damp out. The damping means 90 is placed on the turbine shaft because the turbine shaft carries a larger portion of the torque of the engine and experiences the greatest torsional amplitude. In addition, the turbine shaft has the highest flexibility because of its length relative to the other shafts in the system. To further promote effective damping the device 90 is located closely adjacent the differential drive and preferentially within the ring gear 64 that surrounds the turbine and compressor sun gears 78 and 56, respectively. This arrangement enables a highly effective damping of torsional vibration in addition to minimizing the added engine volume needed to house the damping device. While a specific form of damping device has been illustrated, it should be apparent to those skilled in the art that other forms may be incorporated in an engine of this type without departing from the spirit and scope of the present invention.

Having thus described the invention, what is claimed as novel and desired to be secured by Letters Patent of the United States is:

1. A gas turbine engine comprising:
   a housing;
   a compressor journaled for rotation in said housing;
   a turbine journaled for rotation in said housing;
   a differential drive mounted in said housing and having two inputs and an output shaft;
   first and second shafts respectively connecting said turbine and said compressor to said differential drive; and
   a vibration damper interposed in said first shaft closely adjacent the differential drive for minimizing interaction of torsional vibrations between said turbine, compressor and gear box.

2. A gas turbine engine as in claim 1 wherein:
   said compressor is a centrifugal radial outflow compressor;
   said differential drive is positioned forward of said compressor and said turbine is positioned aft of said compressor;
   said first and second shafts are concentric with respect to one another, the first shaft for said turbine extending through the axis of rotation of said compressor and said second shaft to said differential drive.

3. A gas turbine engine as in claim 2 wherein said damping means comprises a coupling comprising inner and outer rotating members and a plurality of sandwiched leaf springs secured in said inner member and extending generally radially outward to said outer member.

4. A gas turbine engine as in claim 2 wherein:
   said differential drive comprises:
      a sun gear connected to said first shaft and a sun gear connected to said compressor shaft, thereby defining said inputs to said differential drive, said sun gears being axially spaced from one another;
      a first set of fixed planetary gears meshing with said compressor sun gear;
      a second set of planetary gears meshing with the sun gear on said turbine shaft and secured to said output shaft;
      a generally annular ring gear meshing with the first and second sets of planetary gears and extending therebetween;
   said damping means is positioned on said turbine shaft between said first and second sets of planetary gears.

5. A gas turbine engine as in claim 4 wherein said damping means comprises a coupling comprising inner and outer rotating members and a plurality of sandwiched leaf springs secured in said inner member and extending generally radially outward to said outer member.

* * * * *